(12) United States Patent
Jacobs

(10) Patent No.: US 7,102,672 B1
(45) Date of Patent: Sep. 5, 2006

(54) INTEGRATED CMOS IMAGING ARRAY DARK CURRENT MONITOR

(75) Inventor: Adam Jacobs, Woodcliff Lake, NJ (US)

(73) Assignee: Electro Optical Sciences INC, Irvington-on-Hudson, NY (US)

( * ) Notice: Subject to any disclaimer, the term of this patent is extended or adjusted under 35 U.S.C. 154(b) by 701 days.

(21) Appl. No.: 10/071,277

(22) Filed: Feb. 8, 2002

(51) Int. Cl.
*H04N 5/217* (2006.01)

(52) U.S. Cl. ..................... 348/243; 348/257

(58) Field of Classification Search ........... 348/241, 348/243, 244, 247, 245, 242, 246, 296, 251, 348/257, 264
See application file for complete search history.

(56) References Cited

U.S. PATENT DOCUMENTS

| | | | |
|---|---|---|---|
| 4,200,934 A | | 4/1980 | Hofmann |
| 4,703,442 A | | 10/1987 | Levine |
| 4,739,495 A | * | 4/1988 | Levine .................. 348/247 |
| 4,760,453 A | * | 7/1988 | Hieda .................... 348/243 |
| 5,508,740 A | * | 4/1996 | Miyaguchi et al. ......... 348/244 |
| 5,565,674 A | * | 10/1996 | Reele ..................... 250/239 |
| 5,926,214 A | * | 7/1999 | Denyer et al. ............. 348/241 |
| 6,101,287 A | | 8/2000 | Corum |
| 6,157,407 A | * | 12/2000 | Kobayashi ................ 348/241 |
| 6,271,880 B1 | * | 8/2001 | Kameshima et al. ........ 348/244 |
| 6,362,482 B1 | * | 3/2002 | Stettner et al. ........ 250/370.08 |
| 6,369,853 B1 | * | 4/2002 | Merrill et al. ............ 348/302 |
| 6,452,633 B1 | * | 9/2002 | Merrill et al. ............ 348/302 |
| 6,525,769 B1 | * | 2/2003 | Thomas et al. ............ 348/243 |
| 6,607,301 B1 | * | 8/2003 | Glukhovsky et al. ........ 374/175 |
| 6,614,562 B1 | * | 9/2003 | Minemier ................ 358/483 |
| 6,657,669 B1 | * | 12/2003 | Sato et al. ............... 348/350 |
| 6,667,468 B1 | * | 12/2003 | Kurosawa et al. ........ 250/208.1 |
| 6,756,651 B1 | * | 6/2004 | Bozso et al. .............. 257/448 |
| 6,798,456 B1 | * | 9/2004 | Sato ..................... 348/362 |
| 6,833,871 B1 | * | 12/2004 | Merrill et al. ............ 348/302 |
| 6,917,380 B1 | * | 7/2005 | Tay ...................... 348/247 |
| 2002/0024605 A1 | * | 2/2002 | Merrill et al. ............ 348/296 |
| 2004/0183928 A1 | * | 9/2004 | Tay ...................... 348/244 |

* cited by examiner

*Primary Examiner*—Tuan Ho
*Assistant Examiner*—Nelson D. Hernandez
(74) *Attorney, Agent, or Firm*—Rodney T. Hodgson

(57) ABSTRACT

A method, apparatus, and system for accounting for dark current in the output of an imaging array is presented. A dark current monitor on the monolithic semiconductor imaging array is provided. The dark current monitor may be darkened pixels of the imaging array, darkened pixels of another array, or a temperature monitor and associated circuitry necessary to calculate relative dark current from the monitored temperature.

28 Claims, 2 Drawing Sheets

INTEGRATED CMOS IMAGING ARRAY DARK CURRENT MONITOR

FIELD OF THE INVENTION

The field of the invention is the field of digital imaging using complementary metal oxide semiconductor (CMOS) technology.

BACKGROUND OF THE INVENTION

Modern imaging systems using charged coupled device (CCD) arrays and complementary metal oxide semiconductor CMOS arrays have come into increasing use for both industrial and consumer applications. CCD arrays have a longer history and much more time to solve problems arising in manufacture and use. CCD arrays have fewer dark current problems than CMOS arrays. However, CMOS arrays promise less expensive imaging, principally because other functions may be combined on the semiconductor substrate and the well honed techniques developed for computer technology may be used to produce the arrays.

Prior art CMOS arrays have an array of pixels arranged in rows and columns, where light is absorbed in the semiconductor substrate to generate electrons, and the electrons are stored until they are "read out" to generate an image. The charge stored for one pixel is generally sent through a column amplifier to generate a voltage, which is then converted to a digital signal in an analog to digital converter (ADC). The ADC has a minimum signal input $V_{min}$ below which a zero is generated, and a maximum signal input $V_{max}$ which saturates the ADC. Each column amplifier generally has an offset voltage which is added to the signal from the stored electrons, so that the signal sent to the ADC is $V_{min}$ if no light is incident on the pixel and no electrons are stored. Since the amplification is slightly temperature and process dependent, the offset voltage must be adjustable, and means provided to send a "zero" or "dark" signal to the column amplifier so that the offset may be set to a voltage slightly less than $V_{min}$. The "dark" signal may be sent by dummy pixels which in effect ground the input to the amplifier.

However, electrons are generated in the pixel without light by spontaneous means which are generally exponentially dependent on the temperature of the semiconductor material of the pixel. The electrons so generated give rise to "dark current". Most light sensors produce "dark current". The prior art of CMOS image arrays is deficient in that the "dark current" is not accounted for in the case that the array temperature, and also the variation in temperature over the array, changes with time. For the case of a CMOS integrated circuit application, where many functions are carried out on a monolithic semiconductor chip, this is a serious deficiency. Each part of the chip produces a different amount of heat at different times. Part of the array may be near a section of the chip having a dense array of devices liberating a large amount of heat, so that parts of the array will have a large temperature difference with respect to other parts of the array. The temperature and variation in temperature may change as the device is used for imaging, so that the dark current contribution to the image is variable and unaccounted for.

OBJECTS OF THE INVENTION

It is an object of the invention to provide an apparatus and a method to account for the contribution of dark current to the output of a CMOS imaging array.

It is an object of the invention to provide an apparatus and a method to account for the contribution of changing temperature to the contribution of dark current to the output of a CMOS imaging array.

It is an object of the invention to provide an apparatus and a method to account for the contribution of temperature variation over a chip to the contribution of dark current to the output of a CMOS imaging array.

It is an object of the invention to provide a device to monitor dark current of a CMOS imaging array.

It is an object of the invention to provide a device to monitor temperature over a CMOS imaging array and calculate dark current contributions to the output of the CMOS imaging array.

SUMMARY OF THE INVENTION

The present invention is a system, apparatus and method for accounting for the dark current provided in each pixel of a CCD or a CMOS imaging array during the exposure of the array to light in an imaging process. The dark current from permanently darkened pixels, or the temperature at one or more points on the semiconductor chip containing the array, is monitored during the imaging process. The actual dark current measured from the darkened pixels, or a dark current calculated from the temperature, is used in conjunction with a lookup table of dark currents previously measured to calculate the contribution to the signal from each pixel expected from the dark current generated in each pixel during the exposure. Both the temperature dependent dark current and the fixed pattern dark current contribution is then subtracted from the signal measured from each pixel, and the corrected image may then be displayed or used for further manipulation or storage.

DETAILED DESCRIPTION OF THE INVENTION

Figure 1:
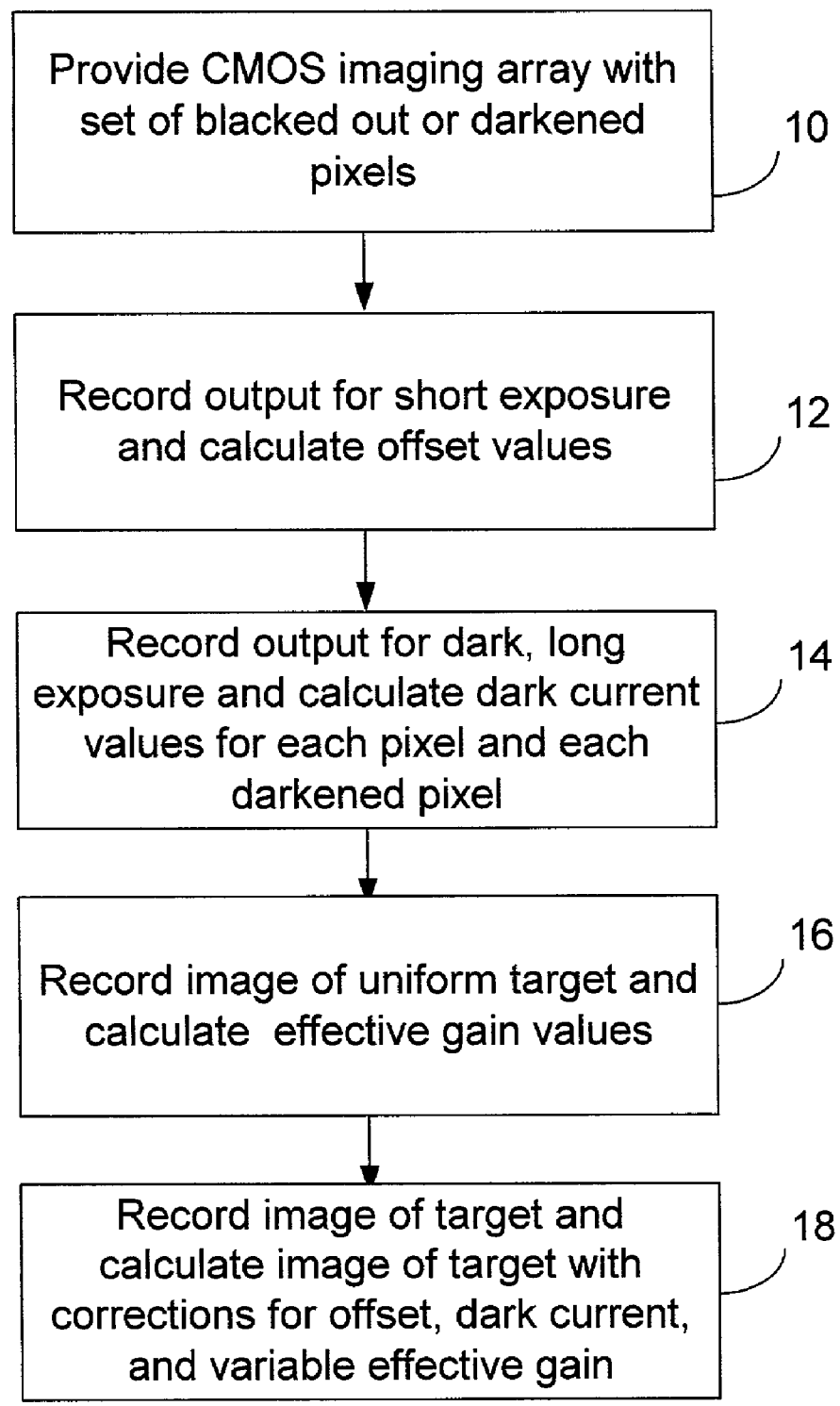
FIG. 1 shows a block diagram of the method of the invention.

To achieve repeatability of performance of an imaging system, it is necessary to compensate for or remove sensor and illumination artifacts in the system. In critical applications, such as imaging of biological tissue for diagnosis of such diseases as cancer, the performance of the imaging system is critical. The imaging system is made up of an illumination system for illuminating an object, an optical system for projecting an image of the object on to an image detector, and hardware and software for producing a computer and/or human readable output for further evaluation. Our purpose in imaging an object is to quantify the amount of light emitted at each point on the target, so as to most accurately map the radiant emittance from each point on the object. For purposes of the following discussion, we make the simplifying assumption, which need not be true, that transillumination and multiple-scattering effects are sufficiently small that all of the light emitted can be considered to arise from reflectance. As an example, a CMOS technology imaging array will be considered. Such a CMOS array is generally constructed on a single chip of silicon, but may in fact be constructed on a chip of any semiconductor material, including but not limited to silicon and silicon-germanium, GaAs, and other near and far Infra-red imaging material. Other imaging array techniques such as CCD arrays as known in the art or to be invented in future are also anticipated by the inventors.

Known random noise sources include:
Photon Shot Noise
Pixel kT C (capacitive) Noise
Dark Current Shot noise
Pixel source follower noise
Column amplifier source follower noise
Vertical sample and hold noise
Column amplifier transistor noise
kT C noise on double sampling amplifier noise
Horizontal sample and hold
Output amplifier noise Each of these types of noise is random, and cannot be removed by calibration.

However, effects that are fixed (i.e., "deterministic") can be removed. These include:
dark current non-uniformity
amplifier offset variations
pixel quantum efficiency (QE) variation
amplifier gain variation
illumination variation The number of photons reaching the $i^{th}$ pixel of the sensor from a particular spot on the target corresponding to the $i^{th}$ pixel is proportional to the illumination ($I_I$) at that spot, multiplied by the (bidirectional) reflectance ($R_I$) of the same spot. (This "local" relation assumes that there are no significant transillumination or lens effects.) The photons reflected from the spot and received at the imaging array are converted to electrons at the $i^{th}$ pixel of the sensor with quantum efficiency $QE_I$.

The number of electrons $n_I$ at each pixel in the sensor is converted to a voltage $V_I$ that is ultimately measured, i.e., the number of electrons at conversion time is what is output from the sensor.

However, electrons are created within the sensor pixel sites through two mechanisms.
dark current
photons converted to electrons The number of electrons arising from dark current in the $i^{th}$ pixel ($n_{dI}$) is generally proportional to exposure time ($\tau$) and exponentially dependent on temperature (T), which we express in functional form as follows:

$$n_{dI} = f_I(T, \tau) \quad (1)$$

The number of photons $n_{pI}$ converted to electrons is given by the number of photons reaching the sensor times the quantum efficiency of that pixel and is expressed by the proportionality expression:

$$n_{pI} = k_I I_I R_I Q E_I \quad (2)$$

Therefore the total number of electrons $n_I$ in the pixel after the exposure is given by the number from the Dark Current+ the number generated by photons $$n_I = n_{dI} + n_{pI} = f_I(T, \tau) + k_I I_I R_I Q E_I \quad (3)$$

These electrons are passed to one or more amplifiers which have a cumulative gain ($G_I$) and an offset ($O_I$) for each pixel. Thus, the signal ($S_I$) at the output of the amplifier (which is the output of the sensor) can be expressed as follows:

$$S_I = G_I(f_I(T, \tau) + k_I I_I R_I Q E_I) + O_I \quad (4)$$

where i=pixel index. We can invert this equation and solve for the unknown reflectance $R_I$ of the target (e.g., skin).

There are variations pixel to pixel in $G_I$, $f_I(T, r)$, $k_I$, $I_I$, $QE_I$, and $O_I$. We are now left with the task of determining these quantities pixel to pixel to solve for the reflectance at that pixel.

In the most preferred embodiment of the invention some of the pixels of the array are permanently covered or blacked over so that no light reaches them. The only signal that comes from these darkened pixels is due to the dark current, multiplied by the pixel amplifier gains, and a fixed dark pattern offset. As the temperature and exposure time of the sensor array changes, the charge measured from these darkened pixels will predict the change in the dark current contribution of the neighboring pixels which are exposed to light. In another preferred embodiment, one or more darkened extra pixels, arrays of pixels, or discrete light detection elements are placed in areas of the chip outside or inside the array. In another preferred embodiment, the temperature of the array is monitored by one or more temperature monitors, relative to a temperature when the dark current of the entire array has been measured, and the relative dark current is calculated from the monitored temperature by external circuitry or by circuitry integrated on the same monolithic substrate as the image array. In preferred embodiments, the dark current or temperature variations across the array is calculated by extrapolation and/or interpolation of the dark current or temperature monitor results at specific points inside or outside the array.

At a constant current bias, the voltage drop across a silicon P-N diode junction shows roughly a $-2$ mV/° C. temperature coefficient. Relative temperature measurements may be made very inexpensively by measuring such a voltage drop. More accurate temperature measurements my be made by a large variety of PTAT (proportional to absolute temperature) circuits which are very well known in the art. Examples of such circuits are given in U.S. Pat. No. 5,798, 669, which is incorporated herein by reference.

FIG. 1 shows a block diagram of a preferred method of the invention. In block 10, a CMOS imaging array is provided with a block to prevent any light from reaching at least one of the pixels of the array. The blocked or darkened pixels are used to monitor the dark current in the lighted pixels. In practice, many pixels must be blocked or darkened because the noise in the measurement of just one pixel would be too great for accurate measurement of dark current. The blocked or darkened pixels are preferably in one corner of the CMOS array. Another preferable position for the blocked pixels is in each of the 4 corners of the (generally rectangular) arrays. In another preferred embodiment, the pixels are on one or more edges, or in any convenient place on the array, depending on the expected characteristics of the images.

In block 12, a very short exposure is taken. The exposure is so short that $\tau$ is small so that the terms including $n_{dI}$ and $n_{pI}$ is negligible in equation 4, and $O_I = S_I$. We assume that the offset changes little with temperature T and with exposure time $\tau$, wavelength $\lambda$, and exposure intensity. The short exposure may be made at any time during the calibration of the imaging array to check that the offset has not drifted since the last time it was measured. The signals $S_I$ measured in block 12 are recorded as the offsets $O_I$ for each pixel.

In block 14, the entire array is kept in the dark, and the signal output from the array is measured for a long time exposure. In this case, the illumination $I_I$ is zero, and the contribution to the signal $S_I$ due to the dark current $G_I(f_I(T, \tau))$ is determined from the results of step 14 and the offsets measured in step 12. Multiple exposures with different times $\tau$ are preferably used to check that $G_I(f_I(T, \tau))$ is approximately linear in $\tau$. The dark current measured from the normally lighted pixels in block 14 is recorded, preferably in a look up table, as well as the dark current from the darkened pixels. In later exposures, the contribution of the dark current to the lighted pixels may be found from the values in the look up table using signal values measured from the darkened pixels when an image is taken. The dark current contribution to the illuminated pixels is proportional to the dark current contribution measured from the darkened pixels. If the temperature of the array changes, and the dark current in both the lighted and unlighted pixels changes exponentially with respect to the temperature.

In a normal setting, it is not convenient to block the light from the sensor (as with a shutter in a camera) so that the dark current lookup table is preferably constructed in the factory before the imaging system is shipped. However, measuring the dark current by blocking the light from impinging on the imaging array may be carried out in the field to check that the characteristics of the array have not changed. In an alternative preferred embodiment, the dark current contribution from the unilluminated array is measured and recorded and the same time as the relative or absolute temperature of the array is measured. When an image is recorded with the array illuminated, the temperature of the array is also monitored. The contribution of the dark current to the image signal is then calculated by assuming the dark current contribution varies exponentially with the temperature of the array. Such calculations are easily carried out by circuitry on the array chip, or by associated circuitry or computers off the chip.

In block 16, a uniformly reflecting target is illuminated with high enough illumination for a short enough time that the dark current signal is negligible with respect to the photon generated signal, and $$S_l = G_l(k_l I_l R_l Q E_l) + O_l \qquad (5)$$

Subtracting the measured values of $O_l$, which are relatively independent of the illumination level, exposure time, and wavelength λ of the illuminating light, and assuming that $R_\lambda$ is constant over all the pixels for each wavelength λ, we can sweep all the variations in illumination, quantum efficiency, and gain into one measured effective gain coefficient $$G_l^* = G_l(k_l I_l Q E_l) \qquad (6)$$

so that for an image of the target taken at the same illumination, wavelength, and exposure time as block 14.

$$S_l = G_l R_l + O_l + G_l f_l(T, \tau) \qquad (6)$$

and the reflectivity $R_l$ may be determined from the measured values of $G_l^*$, the offset $O_l$ measured in block 12, and the dark current contribution $G_l f_l(T, \tau)$ determined from the measurements of block 14 and measurements of the signal from the darkened pixels. For differing illumination intensity, wavelength, and exposure time, the term multiplying $R_l$ is calculated from the measured $G_l^*$ to recover $R_l$.

Figure 2:
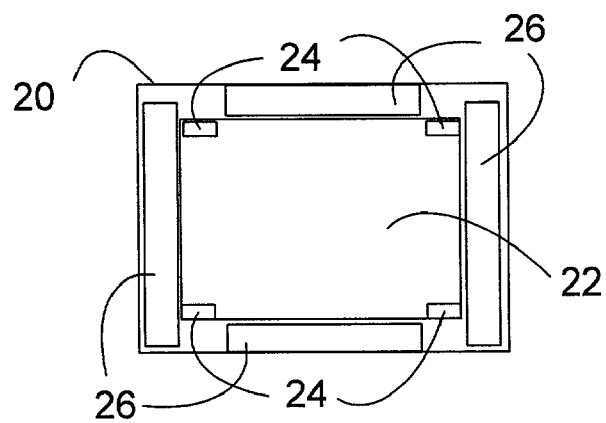
FIG. 2 shows a sketch of the apparatus of the invention.

FIG. 2 shows a sketch of a monolithic semiconductor chip 20 with a rectangular imaging array 22. Portions 24 of the imaging array are shown having the light blocked. The four corners of the array are shown blocked, but only one portion of the array may be blocked, and it may be in any position in the array 22. Separate arrays or detectors on the chip 20 may also be used. Portions 26 of the chip 20 preferably but not necessarily have devices such as amplifiers, analog to digital converters, memory and logic necessary to capture and image, translate the image from analog to digital form and to carry out manipulations on the digital image to remove the effects of dark current on the digital image. In the most preferred embodiment, such manipulations are carried out on the monolithic semiconductor chip. In other preferred embodiments, such manipulations may be carried out off chip or in a separate computer. Regions 24 also represent temperature monitoring devices for monitoring the temperature of the array 22. Such temperature monitoring devices may be located on the chip 20 inside and/or outside the array 22.

Figure 3:
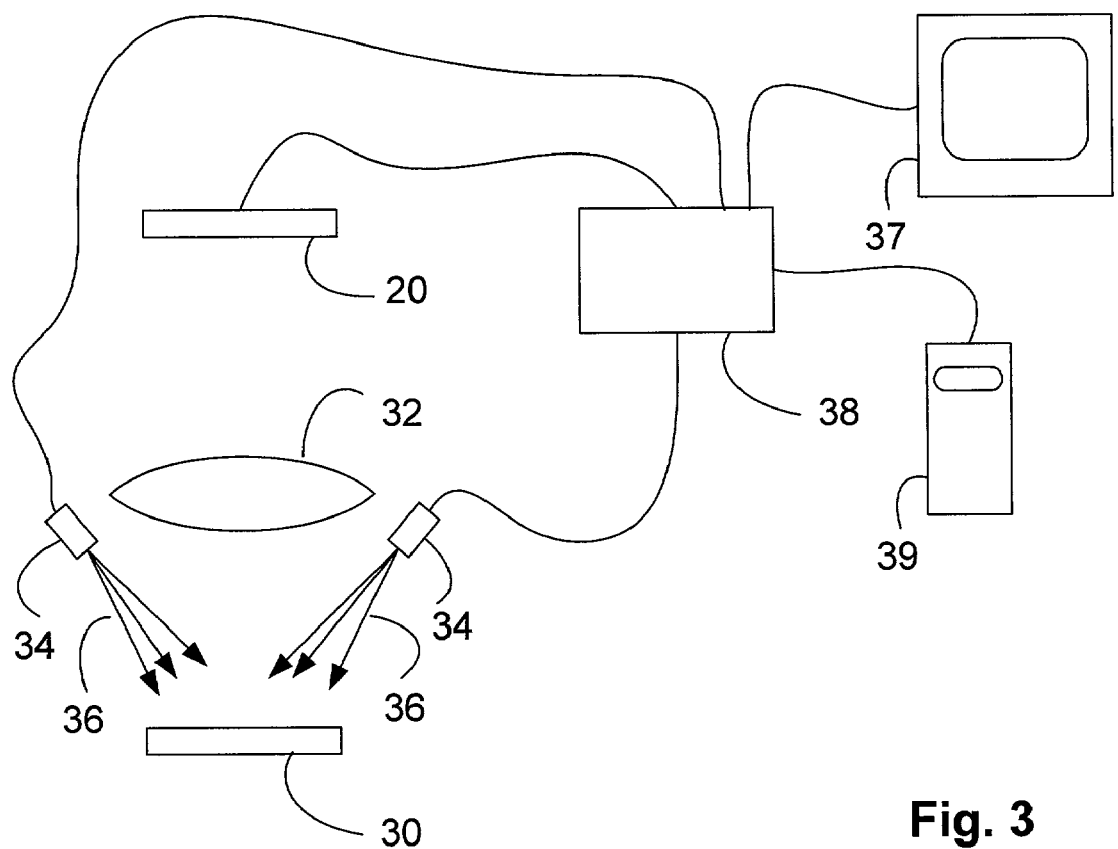
FIG. 3 shows a sketch of the system of the invention.

FIG. 3 shows a sketch of a system for using the apparatus and method of the invention. The object 30 is imaged on the imaging array 22 of chip 20 by an optical system exemplified by lens 32. Illumination is provided by illumination sources 34 which are preferably lamps and most preferably light emitting diodes (LED's) or laser diodes. Circuitry 38 controls the illumination sources 34 and the imaging array and electronic circuitry on chip 20. Circuitry 38 receives data from chip 20, and optionally displays results on a monitor 37 and optionally stores results on a storage device 39, which may be located near the optical system 32 or remotely located and reached by internet or other hard wire or software connection. Circuitry 38 may be located on chip 20, near chip 20 on a circuit board, or may be a separate computer.

Experimental Setup:

We used a normal Melafind® 100 camera from Electro-Optical Sciences, Irvington, NY, which illuminates with a specific pattern of light for each wavelength, generally using different patterns for LED's of different colors. Images were taken with the imaging sensor in the dark for 1, 50, 100, 150, 200, 250 and 300 milliseconds. Then, images were taken of a photographic paper target that had been exposed to a uniform flash density and developed, with the same exposure times for each wavelength of illumination.

The images were calibrated using the method of FIG. 1, for a sensor array which had a number of pixels in one corner blocked by aluminum foil.

Measurements were made after the chip had been run for a few minutes, and had a temperature estimated to be 50° C. The signal to noise ratio measured from test exposures increased from 15:1 with no correction for dark current to 200:1 with a correction for dark current by the method of FIG. 1.

Obviously, many modifications and variations of the present invention are possible in light of the above teachings. It is therefore to be understood that, within the scope of the appended claims, the invention may be practiced otherwise than as specifically described.

I claim:

1. An apparatus, comprising:
    a monolithic device, the monolithic device comprising;
        a first CMOS imaging array;
        a dark current monitoring device integrated with the first CMOS imaging array, the dark current monitoring device monitoring the dark current during the time that the first CMOS imaging array is receiving an image; and
        a means for recording offset signals $O_l$; the offset signals $O_l$ recorded by exposing the first CMOS image array for a time $t_s$, where $t_s$ is a short enough time that dark current signals and projected light produced signals are small compared to offset signals in pixels of the first CMOS array.

2. The apparatus of claim 1, where the monolithic device consists of a single semiconductor chip comprising a silicon substrate with integrated circuitry integrated with a surface of the silicon substrate.

3. The apparatus of claim 1, where the monolithic device consists of a single semiconductor chip comprising a substrate with integrated circuitry integrated with a surface of the substrate comprising silicon germanium material.

4. The apparatus of claim 1, where the dark current monitoring device is at least one semiconductor light sensor integrated with the monolithic device having a means attached to the monolithic device to prevent light from activating the semiconductor light sensor.

5. The apparatus of claim 4, where multiple semiconductor light sensors are used to determine dark current variation over the monolithic device.

6. The apparatus of claim 4, where the at least one semiconductor light sensor is a second CMOS imaging array.

7. The apparatus of claim 6, where multiple CMOS imaging arrays are used to determine dark current variation over the monolithic device.

8. The apparatus of claim 1, where the dark current monitoring device comprises;
at least one temperature monitoring device for monitoring temperature of the monolithic device, and;
associated circuitry to determine dark current from the monitored temperature.

9. The apparatus of claim 8, where multiple temperature monitoring devices are used to determine dark current variation over the monolithic device.

10. The apparatus of claim 8, where the at least one temperature monitoring device is a PTAT circuit integrated with the monolithic device.

11. The apparatus of claim 8, where the at least one temperature monitoring device is a device monitoring the voltage drop across a P-N diode junction having a constant current.

12. The apparatus of claim 8, where the associated circuitry is integrated with the monolithic device to determine dark current from the monitored temperature.

13. The apparatus of claim 1, further comprising;
a stored record of dark current from each pixel of the first CMOS image array, measured previous to the time that the first CMOS image array receiving the image;
associated circuitry using the stored record and the monitored dark current to correct the output of each pixel of the first CMOS image array.

14. The apparatus of claim 13, where the stored record and the associated circuitry using the stored record are integrated with the monolithic device.

15. A method of recording an image of an object using light reflected or transilluminated from the object comprising;
a) forming an image of the object on a first CMOS image array by projecting the light reflected or transilluminated from the object on to the first CMOS image array, the first CMOS image array formed OD a monolithic semiconductor substrate; and
b) monitoring the dark current of the first CMOS image array with at least one dark current monitoring device integrated with the first CMOS imaging array on the monolithic semiconductor substrate, the monitoring of the dark current concurrent with the forming of the image;
c) exposing the first CMOS image array for a time $t_s$, where $t_s$ is a short enough time that dark current and projected light produce signals small compared to offset signals in pixels of the first CMOS array; and then d) recording the offset signals $O_I$ measured as a result of exposure for time $t_s$; and then
e) subtracting $O_I$ from signals produced by the first CMOS image array when exposure times are long enough that dark current signals are not small compared with $O_I$.

16. The method of claim 15, wherein the dark current signals of step c) are produced from an unilluminated first CMOS image array, and further comprising;
f) recording signals $S_I = G_I(f_I(T, t))$ which result from step e).

17. The method of claim 16, further comprising;
g) projecting light from a uniformly reflecting extended object on to the first CMOS array, the light intensity high enough that dark current signals are small compared to signals produced by the light illumination; and
h) recording signals $S_I = G_I(k_I I_I R_I QE_I) + O_I$ from the first CMOS array produced by light projected from the uniformly reflecting object; then
i) subtracting $O_I$ from the results of step f);
j) recording an effective gain coefficient $G_I^* = G_I(k_I I_I QE_I)$.

18. The method of claim 17, wherein;
the step of forming an image of the object comprises recording signals
$S_I = G_I^* R_I + O_I + G_I f_I(T, t)$ from the first CMOS array; further comprising;
k) correcting the recorded values $S_I$ to calculate $G_I f_I(T, t)$, wherein the results of the step of monitoring the dark current are used to correct the recorded values $S_I$; and
l) calculating $R_I$ from the known values of $S_I$, $G_I^*$, $O_I$, and $G_I^*$, $f_I(T, t)$.

19. A system, comprising:
a monolithic device, the monolithic device comprising;
a first CMOS imaging array; and
a dark current monitoring device integrated with the first CMOS imaging array, the dark current monitoring device monitoring dark current concurrently with the recording of an image by the first CMOS imaging array;
a means for recording offset signals $O_I$; the offset signals $O_I$ recorded by exposing the first CMOS image array for a time $t_s$, where $t_s$ is a short enough time that dark current signals and projected light produced signals are small compared to offset signals in pixels of the first CMOS array;
an optical system for imaging light reflected or transilluminated from an object on to the first CMOS imaging array; and
circuitry for correcting the output from the first monolithic CMOS image array to account for the dark current monitored by the dark current monitoring device.

20. The system of claim 19, further comprising a storage device for storing the corrected output.

21. The system of claim 20, further comprising a display device for displaying the corrected output.

22. The system of claim 19, wherein the circuitry for correcting the output is integrated on the monolithic device.

23. The method of claim 15, further comprising;
recording an output from the first monolithic CMOS image array; and
correcting the output from the first monolithic CMOS image array to account for the dark current monitored by the at least one dark current monitoring device.

24. The method of claim 23, wherein the step of correcting comprises;
recording (a) an output of the at least one dark current monitoring device and (b) the dark current output from each pixel of the unilluminated first CMOS image array in a different step than the step of forming the image;

calculating the dark current contribution at each pixel during the forming of the image on the basis of the dark current monitored concurrently with forming the image; and subtracting the dark current contribution at each pixel from the output of the first monolithic CMOS image array.

25. The method of claim 23, wherein the step of correcting is performed by circuitry integrated on the monolithic semiconductor substrate.

26. The method of claim 15, wherein the step of monitoring the dark current comprises;

monitoring the temperature of the first monolithic CMOS imaging array with at least one temperature monitoring device integrated with the first monolithic CMOS imaging array; and calculating the dark current from the monitored temperature.

27. The method of claim 26, wherein the step of monitoring temperature comprises;

monitoring the temperature at a plurality of locations on the monolithic semiconductor substrate; and calculating the temperature variation over the first CMOS image array during the forming of the image.

28. The method of claim 15, wherein the step of monitoring the dark current comprises;

monitoring the dark current at a plurality of locations on the monolithic semiconductor substrate; and calculating the variation of dark current over the first CMOS image array during the forming of an image of the object.

* * * * *